(12) United States Patent
Kohli

(10) Patent No.: US 11,651,377 B2
(45) Date of Patent: *May 16, 2023

(54) SYSTEM AND METHOD FOR AUTHENTICATING A TRANSACTION

(71) Applicant: Mastercard International Incorporated, Purchase, NY (US)

(72) Inventor: Manoneet Kohli, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/391,174

(22) Filed: Aug. 2, 2021

(65) Prior Publication Data

US 2021/0357937 A1 Nov. 18, 2021

Related U.S. Application Data

(63) Continuation of application No. 16/775,391, filed on Jan. 29, 2020, now Pat. No. 11,080,713, which is a continuation of application No. 15/155,644, filed on May 16, 2016, now Pat. No. 10,592,907.

(51) Int. Cl.
| | |
|---|---|
| *G06Q 40/00* | (2012.01) |
| *G06Q 20/40* | (2012.01) |
| *G06Q 20/08* | (2012.01) |
| *G07F 7/10* | (2006.01) |
| *G06Q 20/04* | (2012.01) |
| *G06Q 20/02* | (2012.01) |

(Continued)

(52) U.S. Cl.
CPC ........... *G06Q 20/409* (2013.01); *G06Q 20/02* (2013.01); *G06Q 20/04* (2013.01); *G06Q 20/0855* (2013.01); *G06Q 20/36* (2013.01); *G06Q 20/382* (2013.01); *G06Q 20/4014* (2013.01); *G07F 7/1008* (2013.01)

(58) Field of Classification Search
CPC .... G06Q 20/02; G06Q 20/04; G06Q 20/0855; G06Q 20/36; G06Q 20/382; G06Q 20/4014; G06Q 20/4016; G06Q 20/409; G06Q 20/42; G07F 7/1008
See application file for complete search history.

(56) References Cited

U.S. PATENT DOCUMENTS

| | | | | |
|---|---|---|---|---|
| 2011/0119738 A1* | 5/2011 | Piepenbrink | ............ | H04L 65/60 726/4 |
| 2011/0208550 A1* | 8/2011 | Lamarche | ............... | G06Q 20/24 705/16 |

(Continued)

*Primary Examiner* — Thien M Le
(74) *Attorney, Agent, or Firm* — Buckley, Maschoff & Talwalkar LLC

(57) ABSTRACT

Provided are a system and method for authenticating a transaction. The authentication method may be performed by a user computing device, and may include providing, to a merchant device, account information for payment of a transaction, receiving, from the merchant device, a request to authenticate the transaction using payment software of the user device, and executing the payment software in a virtual environment. The executed payment software may authenticate, with an external server, that the account is paired with the payment software of the user device, and transmit a result of the authenticating to a payment network.

20 Claims, 5 Drawing Sheets

(51) Int. Cl.
*G06Q 20/38* (2012.01)
*G06Q 20/36* (2012.01)

(56) References Cited

U.S. PATENT DOCUMENTS

| | | | |
|---|---|---|---|
| 2013/0262857 A1* | 10/2013 | Neuman | H04L 63/083 |
| | | | 713/155 |
| 2015/0339661 A1* | 11/2015 | Li | G06Q 20/38 |
| | | | 705/41 |
| 2017/0178119 A1* | 6/2017 | Fisher | G06Q 20/326 |
| 2017/0323354 A1* | 11/2017 | Martell | H04M 15/866 |
| 2017/0324752 A1* | 11/2017 | Todasco | H04L 63/0853 |
| 2018/0131658 A1* | 5/2018 | Bhagwan | H04L 51/48 |
| 2018/0137268 A1* | 5/2018 | Sawant | G06F 21/36 |
| 2018/0145987 A1* | 5/2018 | Pan | H04L 63/08 |

* cited by examiner

SYSTEM AND METHOD FOR AUTHENTICATING A TRANSACTION

CROSS-REFERENCE TO RELATED APPLICATION(S)

The present application is a continuation of U.S. patent application Ser. No. 16/775,391, filed on Jan. 29, 2020, in the United States Patent and Trademark Office, which claims the benefit of U.S. patent application Ser. No. 15/155,644, now U.S. Pat. No. 10,592,907, filed on May 16, 2016, in the United States Patent and Trademark Office, the entire disclosures of which are incorporated herein by reference for all purposes.

FIELD

Exemplary embodiments described herein relate generally to electronic transactions for payment of goods and/or services and, more particularly, to authentication of electronic transactions.

BACKGROUND

At present, online and web-based transactions make up a significant and increasing amount of card (or cardholder) not present (CNP) transactions. Because the card is not present during these transactions, the possibility of fraud is much higher than in transactions in which the card is present. To prevent fraud it is important for a merchant to validate and authenticate a card even though the card is not present.

Recently, card issuers and other financial institutions have implemented the use of standardized Internet transaction protocols in an effort to improve online transaction security and to accelerate the growth of electronic commerce. Under some standardized protocols, card issuers or issuing banks may authenticate transactions thereby reducing a likelihood of fraud and chargebacks attributed to cardholder not-authorized transactions. One example of such a standardized protocol is the Three Domain Secure (3-D Secure) protocol. Merchants that register for the 3D Secure protocol may be assured by card issuers or issuing banks that they will be reimbursed for failed transactions which are authenticated using the 3D Secure protocol. Furthermore, the 3D Secure protocol is consistent with and underlies the authentication programs offered by card issuers such as MasterCard SecureCode, Verified by Visa, American Express SafeKey, and others, which are used to authenticate customers on behalf of merchants during remote transactions such as card not present (CNP) transactions performed through the Internet.

The 3D Secure protocol uses existing Secure Sockets Layer (SSL) encryption functionality and provides enhanced security through an issuer authentication of a cardholder during an online shopping session. Authentication software, which may be referred to as a Merchant Plugin (MPI), may be used by participating merchants to exchange messages, pass information and query participants in order to establish an authentication session between the cardholder and the card issuer during an online purchase.

While transacting with 3D Secure compliant banks and merchants, a cardholder may experience the same Internet shopping procedure as previously, except that the cardholder may receive a separate authentication window from the cardholder's bank to determine if they are indeed the cardholder of record. The transaction flow for an online purchase transaction under the protocol relies heavily on the merchant. For example, the cardholder typically may fill in payment data on a merchant web site through an encrypted Secure Sockets Layer (SSL) connection. In response, the merchant sends a message to a directory server or system which in turn queries the card issuer to find out whether the cardholder is enrolled in the 3D Secure program. The card issuer responds to the directory server with a message indicating whether the cardholder is enrolled and, if so, provides a Web address for the financial institution that issued the card (i.e., the issuer or issuing bank). This message is then processed and a response forwarded to the merchant.

Next, the merchant sends a message to the issuing bank to initiate an authentication session between the cardholder and the issuer in which transaction details such as merchant name and transaction amount may also be presented to the cardholder for confirmation. The issuing bank populates an authentication window of the cardholder detailing information related to the transaction such as a merchant name, a transaction amount, a personal security message, and a response area where authentication details can be entered by the cardholder. If the authentication is valid, the issuer sends a message to the merchant indicating the transaction was successful.

During the 3D Secure authentication process, cardholder information is transmitted between the merchant and multiple devices over a public network such as the Internet. As a result, oftentimes indirect and overlapping communication is performed between the merchant and these devices in order to validate a cardholder. In addition, the cardholder information may include sensitive cardholder data, for example, a primary account number (PAN), an expiration date, a card security code, and/or the like, of the cardholder's account. As a result, the sensitive cardholder information is at risk each time it is being transmitted by the merchant over the Internet. Furthermore, there is also a risk that the authentication process may be dropped or otherwise lost, for example, as a result of a service failure of the merchant, the MPI software being corrupted, an aggregator service, and the like.

BRIEF DESCRIPTION OF THE DRAWINGS

Features and advantages of the exemplary embodiments, and the manner in which the same are accomplished, will become more readily apparent with reference to the following detailed description taken in conjunction with the accompanying drawings, in which.

Figure 1:
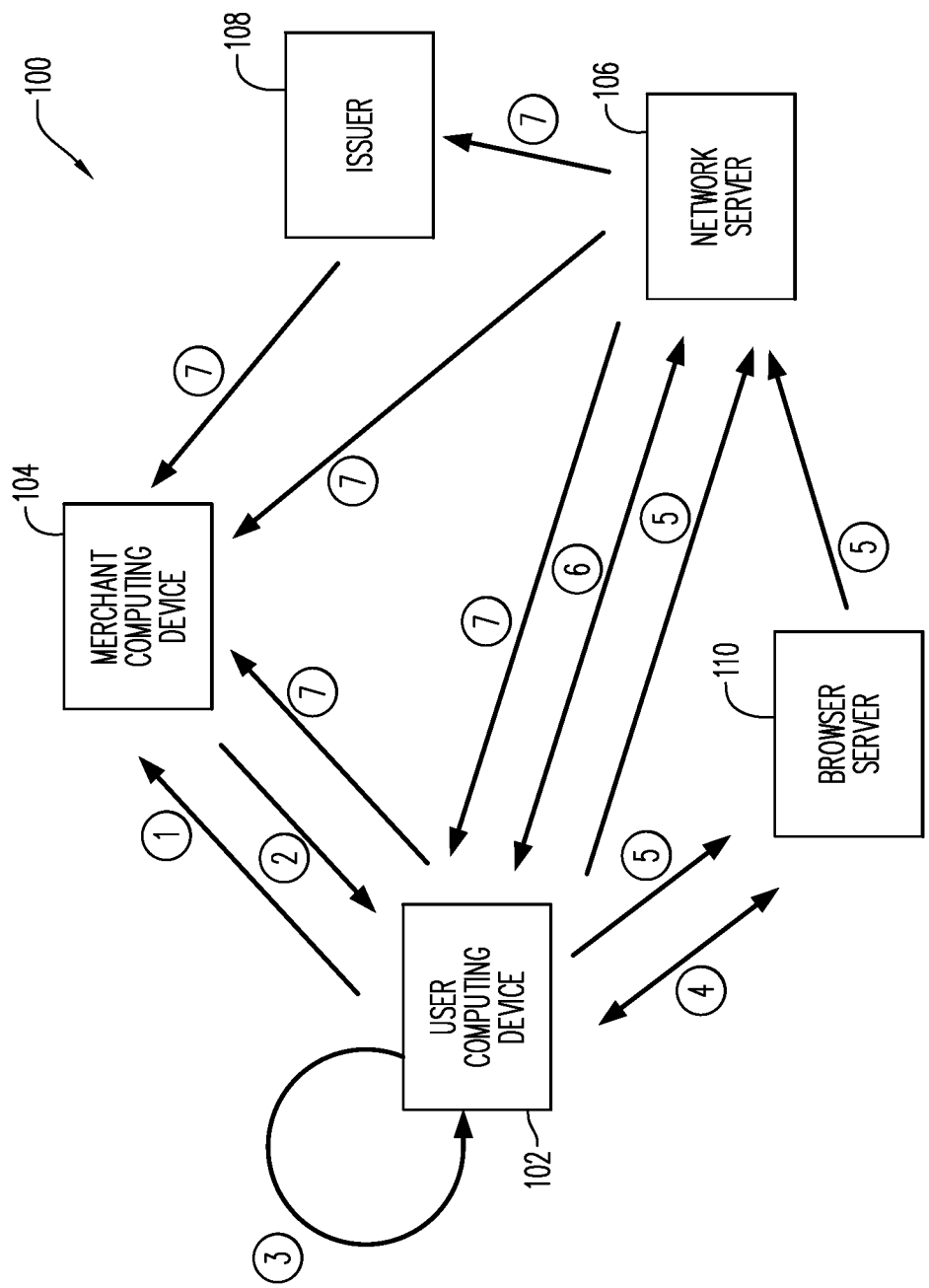
FIG. 1 is a block diagram illustrating an overview of a transaction authentication process in accordance with an exemplary embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various exemplary embodiments. It should be appreciated that various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The exemplary embodiments described herein relate to an authentication process for electronic transactions such as online credit card and debit card transactions (e.g., card not present transactions). The examples herein may be used with or incorporated into existing standardized Internet transaction protocols such as the 3D Secure protocol. In the 3D Secure protocol, a card issuer or issuing bank authenticates a cardholder to a transaction thereby reducing the likelihood of fraud and chargebacks attributed to the cardholder in comparison to a non-3D-secure-authorized transaction. Up until now, a merchant plugin (or MPI) stored on a merchant computing device has been used to control the authentication process of the transaction.

According to various exemplary embodiments, a user computing device (e.g., a cardholder's computing device) may have installed therein payment software such as a plugin, an application programming interface (API), libraries, routines, and/or the like, which may be used to control an authentication of a transaction thereby replacing the need for the merchant to perform the authentication process. The payment software may be installed within a web browser of the user computing device, for example, within Microsoft Internet Explorer, Apple Safari, Google Chrome, Mozilla Firefox, and the like. Web browsers typically offer strong security and feature functionality to a user through a web browser provider. The payment software described herein may be published by a web browser provider (e.g., a browser server, browser plugin server, and the like) such as Apple, Google, Mozilla, Microsoft, etc., or by a financial entity such as MasterCard, and the like. The payment software may be installed and integrated into an existing web browser of the cardholder's computing device thereby integrating the authentication process with the security and feature functionality afforded by the web browser.

The payment software may be installed on the user computing device and may be paired with a payment account owned by the user (e.g., cardholder), for example, a digital wallet that is provided by a browser server, a financial entity, bank, and the like. According to various exemplary embodiments, sensitive cardholder data such as a primary account number (PAN), an expiration date, a card security code (CSC), a card verification value (CVV) code, a secure code, and the like, may reside on the user computing device and/or the browser server, and may not be exposed, or exposed as often over a public network such as to merchant computing devices over the Internet. Also, the authentication process according to various examples may be streamlined in comparison to previous authentication methods because the total amount of messages and/or transmissions that occur over the payment network during the authentication may be reduced, thereby improving the efficiency and reliability of the authentication.

FIG. 1 illustrates an overview of a transaction authentication network 100 in accordance with an exemplary embodiment. Referring to FIG. 1, the network 100 includes a user computing device 102, a merchant computing device 104, a network server 106 (e.g., a payment network server), an issuer computing device 108, and a browser server 110. It should also be appreciated that other entities and/or computing devices may be included within the network 100 other than those shown such as, for example, an acquirer, an interchange, a payment gateway, and/or the like.

The user computing device 102 may receive input from a user thereof and communicate with other devices within the network 100. For example, the user computing device 102 may be a personal computer, a laptop computer, a mobile phone, a smart phone, a tablet, a phablet, a smart watch, a television or other appliance, and the like. The user computing device 102 may also include one or more web browsers that enable the user to access other computing devices located on the World Wide Web. For example, the web browser may include Microsoft Internet Explorer, Apple Safari, Mozilla Firefox, Google Chrome, and the like.

The merchant site may be provided by and operated by the merchant computing device 104 such as a server, a combination of servers, and the like. The user computing device 102 may communicate with the merchant computing device 104 through the Internet. For example, the user of the user computing device 102 may enter a web address of the merchant computing device 104 into a web browser installed on the user computing device 102. The user computing device 102 may provide payment account information to the merchant computing device 104, for example, in an attempt to pay for a transaction during a checkout process, to setup and store a payment account with the merchant such as a recurring payment account, and the like.

In FIG. 1, step 1, a user (or cardholder) of the user computing device 102 provides payment account information to the merchant computing device 104, for example, to establish a stored account with the merchant, to pay for a transaction, and the like. In an example, the user may select an item for purchase and access a checkout page. While checking out the user may provide payment account information into the checkout page and submit the payment account information to the merchant computing device 104 through the merchant site in an attempt to pay for the purchase. As another example, the user may access a payment account entry page or recurring payment entry page, and enter payment account information to be stored for subsequent use. As another example, instead of requiring the user to enter payment account information, the merchant computing device 104 may automatically detect the user accessing the merchant site and trigger step 2.

According to various exemplary embodiments, a payment software, component, application, code, library, module, combination thereof, and/or the like, may be installed on the user computing device 102 and may control the authentication process. For example, the payment software may include a plugin, an API, and the like, and may be installed within a web browser of the user computing device 102. As another example, the payment software may be installed within an operating system of the user computing device

102. When the cardholder provides payment account information in step 1, the merchant computing device 104 may determine whether the payment software has already been installed on the user computing device 102. If the merchant computing device 104 determines that the payment software is installed on the user computing device 102, in step 2 the merchant computing device 104 may initiate or otherwise request execution of the payment software by the user computing device 102. For example, the merchant computing device 104 may automatically trigger the payment software to begin executing or it may prompt the user of the user computing device 102 as to whether the user would like to execute the payment software. In these examples, the merchant computing device 104 may be a merchant server having merchant server code that initiates a check for the payment software and that triggers execution of the payment software on the user computing device 102.

In an alternative embodiment, in step 1 the user of the user computing device 102 may provide payment account information to the merchant web site when the payment software has not been installed on the user computing device 102. In this example, the user computing device 102 may be prompted to download and/or install the payment software. For example, a web browser provider (i.e., browser server 110), the merchant computing device 104, a payment processing entity, and/or the like, may detect that the user computing device 102 does not have the payment software installed therein and may issue a pop-up window on the user computing device 102 requesting install of the payment software. In this example, the payment software may be downloaded to the user computing device from the merchant computing device 104, a payment network, browser server 110, and the like. For example, a cloud service of a payment processing network may attempt to push the payment software to the user computing device 102. As another example, the browser server 110 may request that the user computing device 102 install the payment software. After the payment software is installed, the user may pair a payment account such as a digital wallet with the installed payment software, as is further described with respect to the example of FIG. 3.

Referring again to step 2, in response to the payment software being executed, the user computing device 102 may initiate the loading process of the payment software and execute the payment software in step 3. For example, the user computing device 102 may create a virtual environment or virtual execution environment and execute the payment software within the virtual environment. According to various exemplary embodiments, the virtual environment may be stored, loaded, and/or executed within a trusted platform module (TPM) or other secure area of the user computing device 102. Accordingly, the payment software may execute within a secure and trusted environment on the user computing device 102 thereby creating an additional layer of security.

A TPM may include a secure chip included in the user computing device 102 that stores encryption keys specific to the host system and which are used for hardware authentication. For example, the TPM may include a key pair such as an endorsement key (EK), a storage root key (SRK), session keys, and the like. The pair may be maintained inside the TPM and may not be accessed by external software. According to various exemplary embodiments, the TPM may also include a unique code identifying a combination of the payment software installed on the user computing device 102 and a payment account that is configured to be used with the payment software. Because the unique code may be stored in a trusted area such as the TPM, unauthorized access to the unique code may be prevented such as through a man-in-the-middle attack. The unique code may also be stored with a provider of the web browser such as the browser server 110.

During execution, the payment software may perform the authentication process with one or more of the browser server 110, the issuer 108, the authentication server 106, and the merchant computing device 104. Also, an indication or notification of a successful authentication may be transmitted from the payment network to the merchant computing device 104. In step 4, the payment software may communicate with the browser server 110. For example, the payment software may validate the use of the payment account in combination with the payment software installed on the user computing device 102. As further described in the example of FIG. 3, when a payment account is attached to, paired with, or bound to a payment software (e.g., plugin) installed on the user computing device 102, a unique code may be generated which identifies the pairing of the payment account and the payment software. This unique code may be stored on the browser server 110, and may be used to authenticate the payment account with the payment software installed on the user computing device 102. Also, the unique code may be stored in the TPM of the user computing device 102 and as such it is prevented from being modified by unauthorized firmware or software. In some examples, only one payment software may be installed on a device, and only one payment account may be paired to the payment software. That is, one machine may be bound to one payment software, and one payment software may be bound to one payment account. As another example, more than one payment account may be paired with the payment software and more than one payment software may be installed on a device.

In response to the combination of the payment software and the payment account being validated by the browser server 110, the payment account may be verified in step 5. The payment software may request that the browser server 110 perform the verification. As another example, the payment software may request that the network server 106 perform the verification. In an example in which the payment account is a digital wallet that is provided by the browser server 110 such as Google Wallet, Apple Pay, Samsung Pay, and the like, the browser server 110 may perform the verification. In another example in which the payment account is a digital wallet or another type of account provided by an issuing bank or other financial entity such as MasterCard MasterPass, Visa Checkout, and the like, the payment network server 106 may verify the account.

The network server 106 (also referred to as payment network sever 106) may store payment account information of an issuing bank, a financial entity, a payment processor, an acquiring bank, and the like. The network server 106 may be a directory server of a payment processor or other financial services entity. The network server 106 may provide centralized decision making capabilities to merchants and cardholders that are enrolled in the authentication service such as the Internet authentication protocol service. Also, the network server 106 may store an identification of the accounts enrolled in the Internet authentication protocol. In yet another example, the network server 106 may be more than one server, for example, a combination of servers or entities in a payment network.

In a case in which the browser server 110 performs the payment account verification, the browser server 110 may transmit a notice of successful verification of the payment account to the network server 106 in step 5. The notification of successful verification may initiate a second authentication process performed by the network server in step 6. As another example, although not shown in FIG. 1, the browser server 110 may transmit a notice of successful verification of the payment account to the merchant computing device 104. As a result, and the transaction may be finalized by the merchant computing device 104. Here, the browser server 110 may stand in the place or act on behalf of an acquiring bank of the merchant.

In step 6, a second authentication may be performed. In this step, an account holder of the payment account may be authenticated. For example, the account holder may be authenticated according to a standardized Internet authentication protocol such as a 3D Secure authentication. It should be appreciated that the payment software may determine whether the account holder is enrolled in the authentication process prior to this step. As an example, the payment software may control the user computing device 102 to check whether the payment account paired with the payment software is enrolled in the Internet authentication protocol prior to the transaction being initiated, during one of the previous steps such as step 1 or step 2, and the like. To perform the verification, the user computing device 102 may transmit an enrollment check message over a secured channel to the payment network server 106 such as a 3D secure enrollment verification request. The enrollment check may include information identifying the payment account such as an account number (PAN), an expiration date, a CVV, and/or the like, which have been previously associated with the payment software installed on the user computing device 102. Based on the account information included in the enrollment check request, the payment network server 106 may verify an account holder of the payment account by transmitting an enrollment verification response over the secured channel. Verification of the enrollment may be stored by the payment network server 106 and continue to be valid for a predetermined amount of time.

Accordingly, the payment network server 106 may be aware that the account being used in the example of FIG. 1 has been previously enrolled in the standardized Internet authentication service. In response, the payment network server 106 may initiate a pop-up window on the user computing device 102 and request the user to input a secure code known to the account holder during step 6. During the standardized Internet authentication, the payment network server 106 may determine that the user of the user computing device 102 is a valid account holder of the payment account and also determine an issuing bank (i.e., an issuer) of the account.

The enrollment verification check may be performed prior to or when the user computing device 102 attempts to make a purchase on a merchant site. Also, communication between the user computing device 102, the merchant computing device 104, and the payment network server 106 during the internet protocol enrollment verification and the authentication process may be performed over a secured channel between each of the payment software installed on the user computing device 102, the merchant computing device 104, and the payment network server 106. Also, after an enrollment verification check is successfully performed, the enrollment check may continue to be valid (or remain valid) with the payment network server 106 for a period of time, for example, 24 hours, 48 hours, and the like. In this example, the payment account included in the transaction may automatically be determined as being enrolled in the verification check if the previous enrollment check was successful and if the period of time has not elapsed. As another example, the enrollment verification process may be skipped altogether.

In step 7, an indicator of a successful second authentication is transmitted to the merchant computing device 104 or to the user computing device 102. For example, the indicator may include an authentication response message including a universal authentication field such as a UCAF that includes an accountholder authentication value (AAV). In the example of FIG. 1, the successful authentication indicator may be transmitted from the network server 106 to the merchant computing device 104 or it may be transmitted from the issuer 108 to the merchant computing device 104.

For example, the network server 106 may transmit a successful verification notice of the payment account and the payment software (first authentication). As another example, in response to the payment network server 106 verifying the account holder of the payment account (second authentication), the payment network server 106 may transmit a successful authentication indicator to the merchant computing device 104. As another example, in response to the payment network server 106 verifying the payment account, the payment software, and the account holder, the payment network server 106 may transmit the successful authentication indicator (first and second authentication).

In step 7, the successful authentication indicator may be transmitted from the issuer computing device 108 to the merchant computing device 104 instead of from the network server 106. In this example, the network server 106 may provide the issuing computing device with payment account information and the issuer computing device 108 may perform the authentication according to the issuer's authentication scheme, and transmit the successful authentication indicator to the merchant computing device 104. In response to receiving the authentication indicator from the payment network or the issuer 108, the merchant computing device 104 may finalize the transaction and transmit a notice of approval of the transaction to the user computing device 102.

As yet another example, in step 7, the notice of successful authentication (the first and/or the second authentication) may be sent to the payment software installed on the user computing device 102. In this example, the payment software may cause the user computing device 102 to transmit the notification of successful authentication to the merchant computing device 104 instead of the notification being sent from the payment network server 106 or the issuer 108.

Figure 2:
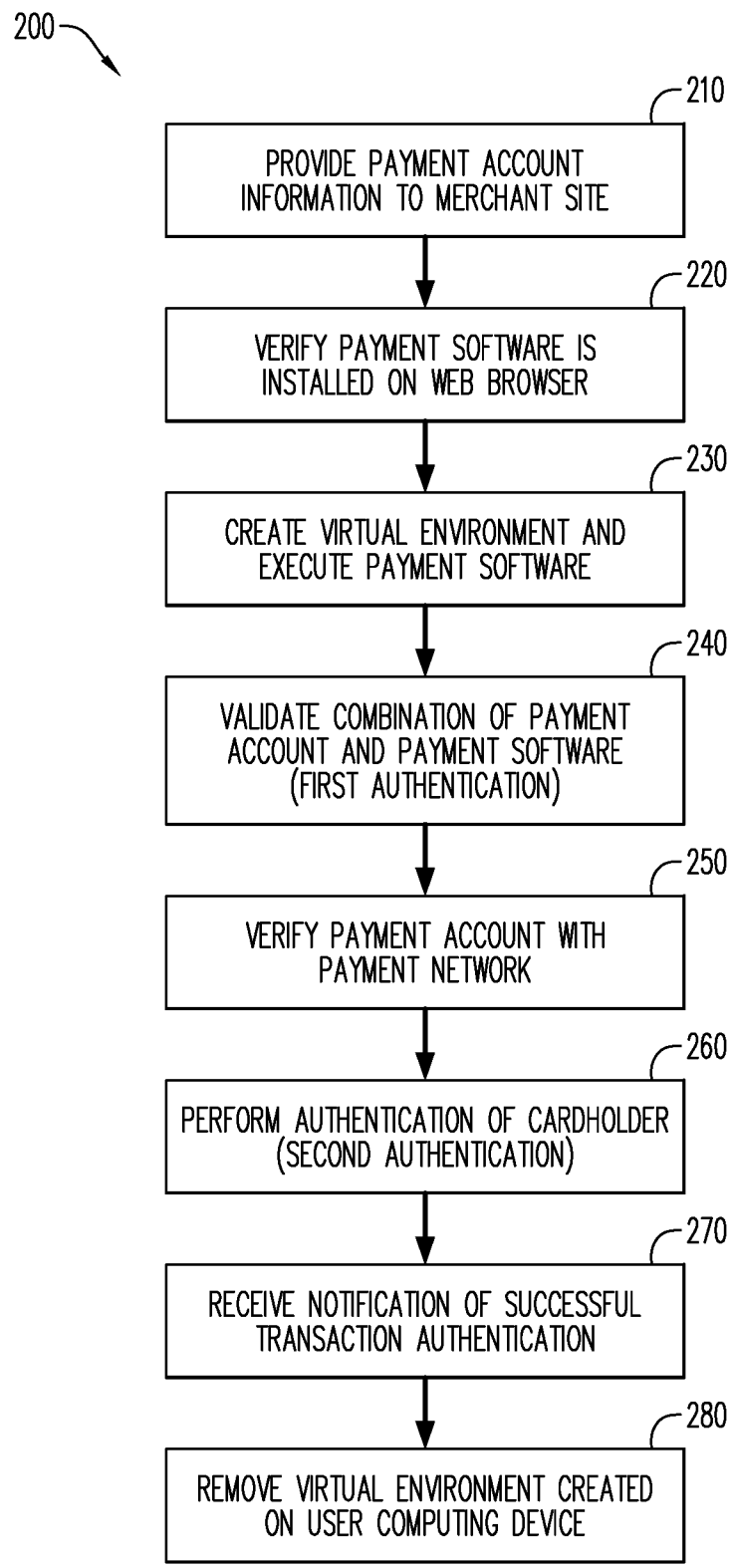
FIG. 2 is a diagram illustrating a method of authenticating a transaction in accordance with an exemplary embodiment.

FIG. 2 illustrates an example of a method of the transaction authentication process shown in FIG. 1, in accordance with an exemplary embodiment. The method described in the example of FIG. 2 may be performed by the user computing device 102 (i.e., a cardholder's computing device).

Referring to FIG. 2, in 210, a user of the computing device provides payment account information to the merchant. In this case, the user may initiate a transaction for the purchase of goods and/or services on a merchant website. As another example, the user may attempt to enroll a payment account as a recurring account or a stored account with the merchant.

In response, the merchant computing device may detect whether payment software for performing an authentication of the transaction is installed on the user computing device. For example, the merchant computing device may include code that initiates a check with the user computing device. In 220, the user computing device verifies that the payment software is installed. The verification may be in the form of initiating the authentication process, or in a message delivered to the merchant computing device. The payment software may include a plugin or API that is installed within a web browser stored on the user computing device.

In response to a verification of the payment software being triggered by the merchant computing device, in 230 the user computing device creates a virtual environment or virtual space, for example, in a trusted storage area of the user computing device. The user computing device also executes the payment software. For example, the payment software may be executed in a secure storage area of the user computing device creating an additional layer of security for the payment software.

In 240 the payment software validates a payment account that is configured for use with the payment software. An example of storing payment account information with payment software is further described with reference to FIG. 3. The payment account may be a digital wallet that includes a card account, and the like, that may be used to make online purchases. When a payment account is bound to or otherwise paired with the payment software, a unique identification (ID) may be created which identifies both the payment account of the user and the payment software installed on the user computing device. In 240, the payment software may verify a unique ID of the pairing of the payment account with the payment software stored in the trusted area of the user computing device with a unique ID stored at an external server such as a browser server. Accordingly, a first authentication of the transaction may be performed. In some cases, notification of the first authentication may be transmitted to the merchant computing device, and the processing of the transaction may be finalized. Also, the process may continue to step 250.

After validating the combination of the payment account and the payment software, in 250 the payment software verifies a validity of the payment account with a payment network. The payment software may cause the user computing device to transmit payment account information to a payment network server, a browser server providing a digital wallet, and the like. In the case of the payment network server, the payment network server may verify the card validity based on information provided from an issuer of the card. In the case of the browser server, the browser server may stand in the place of the merchant's acquiring bank and validate the payment account. After the payment account is validated, a notification of the payment account validation may be transmitted to the merchant computing device, and the processing of the transaction may be finalized, or the process may continue to step 260.

In 260, a second authentication of the transaction may be performed. For example, the second authentication may include a cardholder or accountholder authentication according to a standardized Internet protocol such as the 3D Secure protocol. During the second authentication, the payment network server may transmit or initiate a pop-up window through the payment software of the user computing device. Accordingly, a user of the user computing device may be prompted to input a password, secure code, token, or the like, which may be used to identify the user as the cardholder on the account. In response, an accountholder authentication value may be generated by the payment network server and be transmitted from the payment network server to an issuer of the account or directly to the merchant computing device. The authentication value may indicate successful authentication of the account holder, and may be included in an authorization response message of a 3D Secure authentication.

In 270, the user computing device receives a notification of a successful transaction authentication. For example, the notification may be a successful transaction notification received from the merchant computing device or an authentication value received from the browser server or the payment network. The successful transaction notification may be a payment approved notification provided from the merchant computing device. In this example, the issuer or the payment network server may provide a notice of transaction authentication to the merchant computing device directly without sending notice to the user computing device. Accordingly, the user computing device receives the notification from the merchant computing device in the form of a successful transaction notice. As another example, the payment software of the user computing device may receive the authentication value generated in 260, and may further provide the authentication value to the merchant computing device.

In 280, the virtual environment created on the user computing device is destroyed, flushed out, or otherwise removed. For example, the user computing device may receive a request from the browser server to destroy the virtual space.

Figure 3:
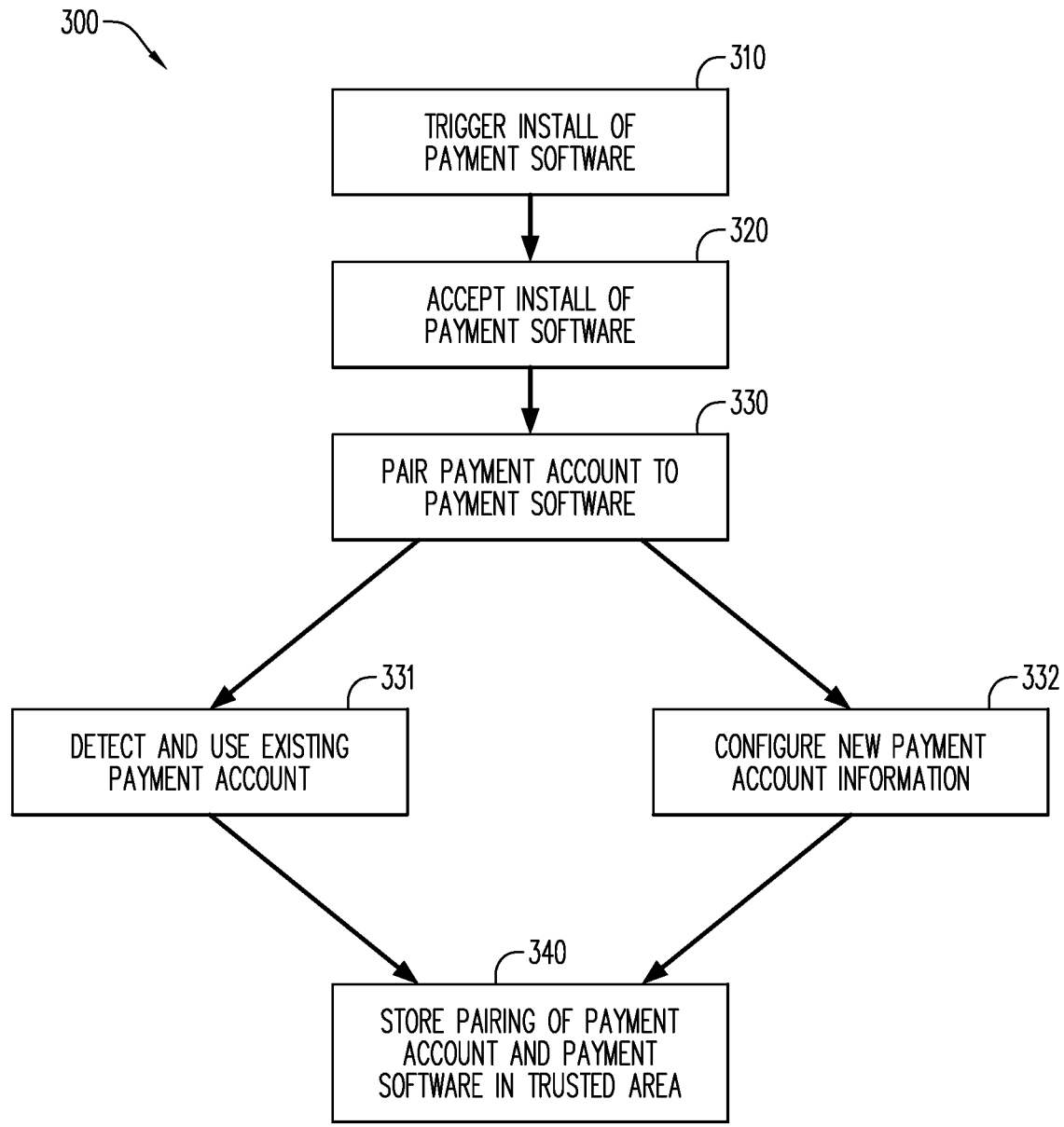
FIG. 3 is a diagram illustrating a method of configuring a payment account to be used with payment software, in accordance with an exemplary embodiment.

FIG. 3 illustrates an example of a method of configuring a payment account to be used with payment software, in accordance with an exemplary embodiment. The method of FIG. 3 may be incorporated with and/or may partially overlap with the method described in the example of FIG. 2.

Referring to FIG. 3, in 310 the user computing device receives a request to install payment software. For example, a user of the user computing device may be accessing a merchant's website through a web browser. In response to payment account information being provided, the web browser may initiate a browser call to install the payment software described herein. For example, the payment software may be received from a browser server corresponding to the web browser, a third party financial services provider, a bank, and the like. In some cases, the web browser may receive a request to install the payment software. For example, a browser server or a payment processor entity may attempt to push the payment software to the user computing device.

In 320, the user of the user computing device accepts installation of the payment software. As another example, the web browser may automatically accept installation of the payment software. According to various exemplary embodiments, the payment software may be a plugin, API, code, library, combination thereof, and the like, which may be installed within a web browser on the user device such as Microsoft Internet Explorer, Apple Safari, Google Chrome, Mozilla Firefox, and the like. In some examples, the payment software described herein may take the place of or render unnecessary the merchant plugin (MPI) used in a 3D Secure authentication. That is, the 3D Secure authentication may be performed using the payment software described herein that is installed on the user computing device instead of being performed by the merchant plugin installed on a merchant computing device.

During or after the installation process of the payment software, in 330 the user of the user computing device may be prompted to pair payment account information with the newly installed payment software. According to various exemplary embodiments, one device may include one payment software application, and one payment software application may include one payment account paired therewith. Accordingly, the present examples may include one device, with one software, with one payment account.

During the pairing process, the user may bind an existing payment account with the installed payment software in 331. For example, the payment software may detect a previously installed payment account such as a digital wallet and prompt the user if they would like to bind the existing payment account with the payment software. As another example, in 332 the user may add new or previously unknown payment account information for use with the payment software. In this step, the user may enter account details, for example, a primary account number (PAN), an expiration date, a security code, and the like. Also, in 332 the user may configure a new digital wallet including the user account details. By configuring a new wallet, the user computing device may create a wallet 'config' file within an operating system of the user computing device.

In 340, a result of the pairing process performed in 330 is stored. Here, the result may be stored in a trusted area such as a TPM of the user computing device. When a payment account is paired with payment software, the browser server may create a unique ID and store the unique ID in the trusted area and also at the browser server. The unique ID may identify both the payment software and the user's payment account that have been paired together. For example, the unique ID may identify a plugin and a digital wallet.

Figure 4:
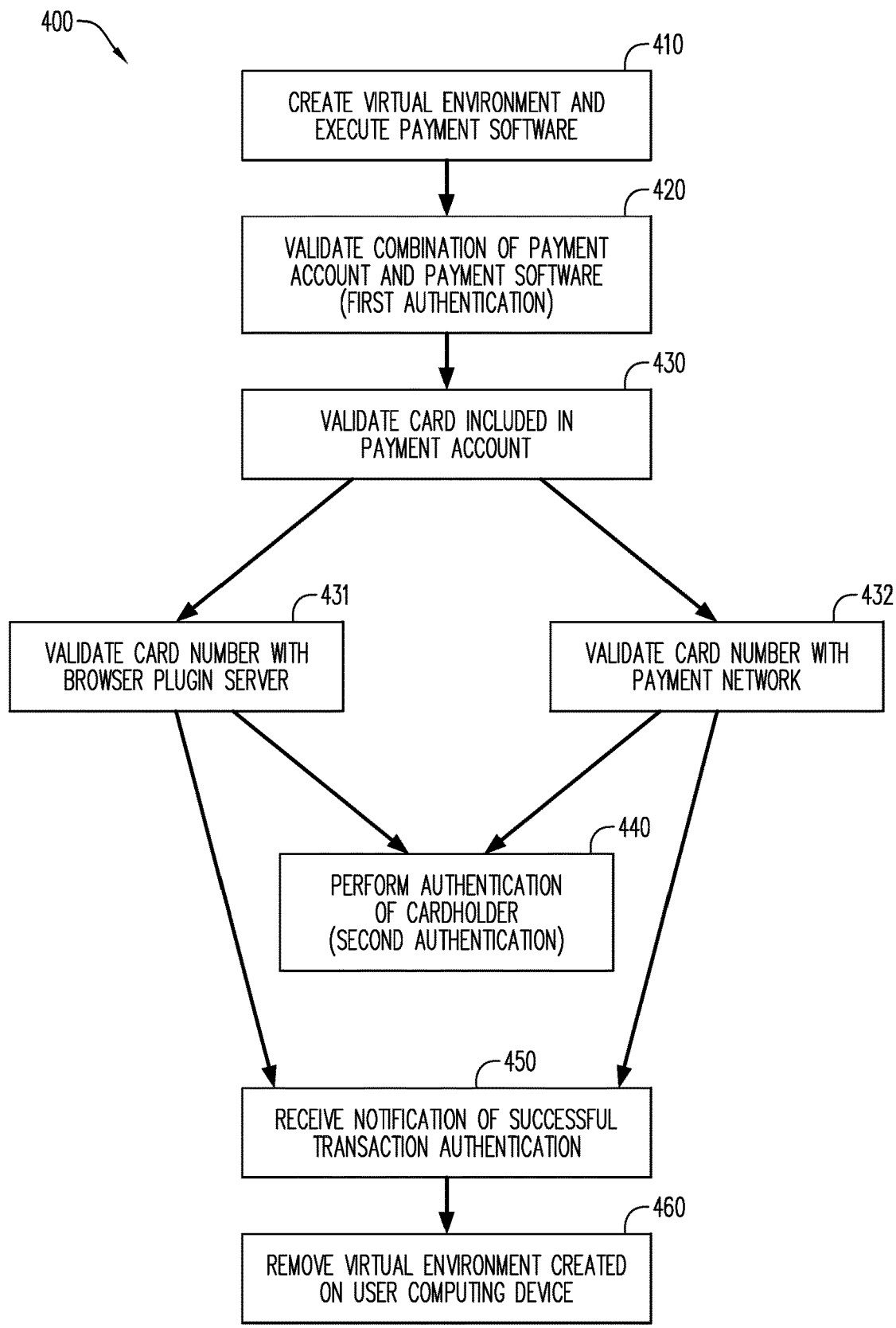
FIG. 4 is a diagram illustrating a method of authenticating a transaction in accordance with another exemplary embodiment.

FIG. 4 illustrates a method of authenticating a transaction in accordance with another exemplary embodiment. The method of FIG. 4 may be performed by a user computing device. Also, the method described in FIG. 4 may be an extension of the method described in the example of FIG. 3 or may be a stand-alone method.

Referring to FIG. 4, operations 410 and 420 are the same as operations 230 and 240 described in FIG. 2, and thus redundant descriptions is omitted for brevity. In 430, the payment software validates a payment card included in the payment account. For example, the payment account may be a digital wallet, and the payment card may be a credit card number, debit card number, and the like, stored within the digital wallet. For example, the payment software may validate the payment card with the browser server or with the payment network. For example, if the digital wallet is provided by the browser server, the payment software may validate the payment card with the browser server in 431. As another example, if the payment card is a card provided by a bank, payment processor, or the like, included in a payment network, the payment card may be validated by the payment network in 432.

In either example, after the card is validated, the method may proceed to step 440 and a second authentication may be performed. For example, the second authentication may authenticate the cardholder and may include a 3D Secure authentication. The second authentication is optional. In some cases, the method may skip operation 440 and proceed to operation 450 in which a notice of successful authentication is received by the user computing device. Also, in 460 the virtual environment created on the user computing device is destroyed, flushed out, or otherwise removed. For example, the user computing device may receive a request from the browser server to destroy the virtual space.

Figure 5:
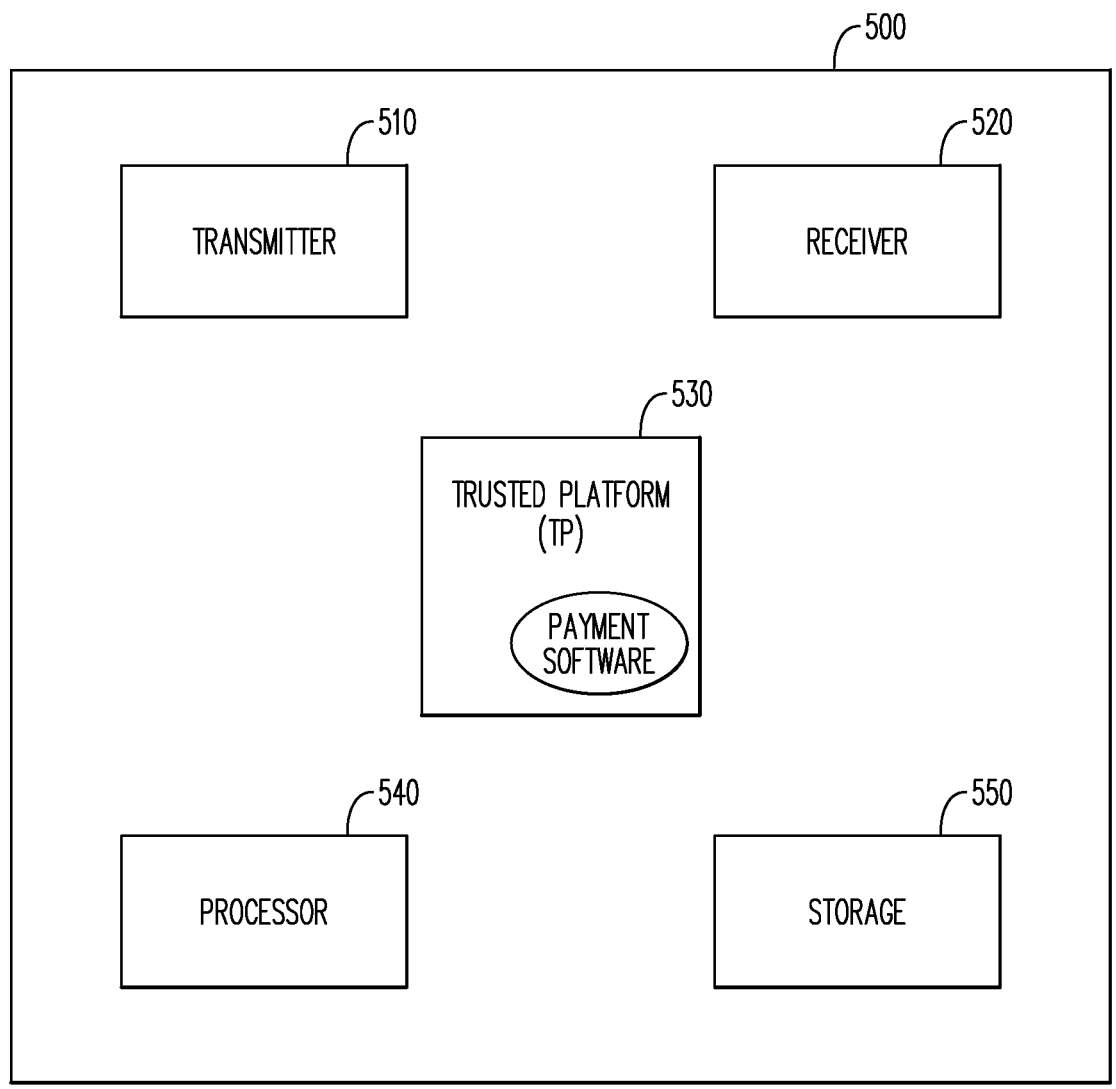
FIG. 5 is a diagram illustrating a user computing device in accordance with an exemplary embodiment.

FIG. 5 illustrates a user computing device in accordance with an exemplary embodiment. The examples of the user computing device described with reference to FIGS. 1-4 may be incorporated into user computing device 500 described in FIG. 5.

Referring to FIG. 5, the user computing device 500 includes a transmitter 510, a receiver 520, a processor 540, and a storage 550. The user computing device 500 may also include a trusted platform module 530 such as a chip that may include a storage and a processor that can store and protect sensitive information of the user computing device 500, and that can restrict access thereto. In this example, the transmitter 510 may transmit, to a merchant computing device, payment account information. For example, the transmitter 510 may transmit the payment account information in an effort to settle a transaction with the merchant corresponding to the merchant computing device.

The merchant computing device may transmit a request to the user computing device 500 to perform an authentication. For example, the receiver 520 may receive, from the merchant computing device, a request for a payment software of the user device to authenticate the transaction. In response, the processor 540 may create a virtual environment in the trusted platform module 530, and execute the payment software therein. During execution, the payment software may authenticate, with an external server, that the account is paired with the payment software of the user computing device 500, and the payment software may cause the transmitter 510 to transmit a result of the authenticating to a payment network. In this example, the payment software may be stored in, executed on, and flushed out from the virtual environment of the trusted platform module 530. As another example, the payment software may be stored in the storage 550 and executed by the processor 540.

According to various exemplary embodiments, the payment software may be a plugin or API that is added to a web browser of the user computing device 500. When the processor 540 initiates or loads the web browser, the payment software installed therein may create a trust store on the trusted platform (TP) 530. The trust store may be used to manage card details. The trust store may support seamless and auto population of payment details for a transaction. The trust store may be stored and secured in the TP 530 in a similar fashion as private device and system keys are stored and secured within the TP 530. Accordingly, the payment software may store the payment details and execute the authentication process within a secured environment.

Payment account information may be added to the payment software and stored along with or within the trust store in the TP 530. In this example, an identification (ID) of the trust store may be used to identify a combination of the payment software and the payment account. For example, the trust store ID stored in the TP 530 may be compared with a trust store ID stored in the browser server to authenticate the combination of the payment software and the payment account of the user computing device 500. The payment account may be a digital wallet and the payment software may be a browser plugin. In this example, the trust store ID may identify the digital wallet and the browser plugin.

During execution of the payment software, the authentication method may be performed within the TP 530 of the user computing device 500. As another example, the user authentication method may be performed by the processor 540 in the storage 550. The authentication method may include one or more of the operations described in the examples of FIGS. 1-4, and thus, redundant description is omitted for brevity.

According to various exemplary embodiments, described herein is a system and method for authenticating a transaction in which a payment software installed on a user computing device performs a number of steps in the authentication process. For example, the payment software may be installed within a web browser of the user computing device, thus, integrating existing security and feature functionality of the web browser with the transaction authentication process.

The examples described herein refer to a user computing device. However, it should also be appreciated that the operations and steps performed by the user computing device may be performed by an agent or other authorized module or entity on behalf of the user computing device, for example, a hardware module authorized by or connected to the user computing device, a software module, or a combination thereof.

As used herein, the terms card, transaction card, financial transaction card, payment card, and the like, refer to any suitable transaction card, such as a credit card, a debit card, a prepaid card, a charge card, a membership card, a promotional card, a frequent flyer card, an identification card, a gift card, and the like. As another example, the terms may refer to any other device or media that may hold payment account information, such as mobile phones, Smartphones, personal digital assistants (PDAs), key fobs, computers, and the like. The transaction card can be used as a method of payment for performing a transaction.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. An apparatus comprising:
    a network interface configured to receive a request to authenticate an account identifier stored on a user device; and
    a processor configured to execute software on the user device which uses the account identifier, wherein the processor is configured to verify, with a remote server, the account identifier based on a software identifier of the software on the user device, and control the network interface to transmit a result of the authentication to a computing system.

2. The apparatus of claim 1, wherein the processor is configured to transmit, to the remote server, an identification code that identifies a combination of the account identifier and the software identifier.

3. The apparatus of claim 2, wherein the processor is further configured to pair the account identifier with the software identifier to generate the identification code.

4. The apparatus of claim 1, wherein the processor is further configured to retrieve the account identifier and the software identifier from at least one of a secure element and a trusted platform module (TPM) of the user device.

5. The apparatus of claim 1, wherein the account identifier is associated with a primary account number (PAN) stored in a digital wallet.

6. The apparatus of claim 1, wherein the processor is configured to control the network interface to transmit the result of the authentication to a merchant computing device.

7. The apparatus of claim 1, wherein the processor is further configured to create a virtual execution environment within the user device, wherein the processor executes the software within the created virtual execution environment.

8. The apparatus of claim 1, wherein the software comprises a payment program that is running on the user device and that uses the account identifier as a payment account identifier during a payment process.

9. A method comprising:
    receiving a request to authenticate an account identifier stored on a user device;
    executing software on the user device which uses the account identifier, wherein the executing comprises verifying, with a remote server, the account identifier based on a software identifier of the software on the user device; and
    transmitting a result of the authentication to a computing system.

10. The method of claim 9, wherein the verifying comprises transmitting, to the remote server, an identification code that identifies a combination of the account identifier and the software identifier.

11. The method of claim 10, wherein the method further comprises pairing the account identifier with the software identifier to generate the identification code.

12. The method of claim 9, wherein the method further comprises retrieving the account identifier and the software identifier from at least one of a secure element and a trusted platform module (TPM) of the user device.

13. The method of claim 9, wherein the account identifier is associated with a primary account number (PAN) stored in a digital wallet.

14. The method of claim 9, wherein the transmitting comprises transmitting the result of the authentication to a merchant computing device.

15. The method of claim 9, wherein the method further comprises creating a virtual execution environment within the user device, and executing the software within the created virtual execution environment.

16. The method of claim 9, wherein the software comprises a payment program that is running on the user device and that uses the account identifier as a payment account identifier during a payment process.

17. A non-transitory computer-readable medium storing instructions which when executed by a processor cause a computer to perform a method comprising:
   receiving a request to authenticate an account identifier stored on a user device;
   executing software on the user device which uses the account identifier, wherein the executing comprises verifying, with a remote server, the account identifier based on a software identifier of the software on the user device; and
   transmitting a result of the authentication to a computing system.

18. The non-transitory computer-readable medium of claim 17, wherein the verifying comprises transmitting, to the remote server, an identification code that identifies a combination of the account identifier and the software identifier.

19. The non-transitory computer-readable medium of claim 18, wherein the method further comprises pairing the account identifier with the software identifier to generate the identification code.

20. The non-transitory computer-readable medium of claim 17, wherein the method further comprises creating a virtual execution environment within the user device, and executing the software within the created virtual execution environment.

* * * * *